(12) United States Patent
McMullen et al.

(10) Patent No.: US 7,042,118 B2
(45) Date of Patent: May 9, 2006

(54) PERMANENT MAGNET ROTOR CONSTRUCTION WHEREIN RELATIVE MOVEMENT BETWEEN COMPONENTS IS PREVENTED

(75) Inventors: Patrick T. McMullen, Long Beach, CA (US); Co Si Huynh, Brea, CA (US)

(73) Assignee: Calnetix, Cerritos, CA (US)

( * ) Notice: Subject to any disclaimer, the term of this patent is extended or adjusted under 35 U.S.C. 154(b) by 193 days.

(21) Appl. No.: 10/704,310

(22) Filed: Nov. 10, 2003

(65) Prior Publication Data

US 2005/0099079 A1 May 12, 2005

(51) Int. Cl.
*H02K 41/00* (2006.01)
(52) U.S. Cl. ..................................... 310/12
(58) Field of Classification Search ........... 310/156.11, 310/156.22, 156.28, 156.29
See application file for complete search history.

(56) References Cited

U.S. PATENT DOCUMENTS

| | | | |
|---|---|---|---|
| 4,365,179 A * | 12/1982 | Mayo Magdaleno | 310/81 |
| 4,667,123 A * | 5/1987 | Denk et al. | 310/156.22 |
| 4,741,094 A * | 5/1988 | Denk et al. | 29/598 |
| 4,942,322 A * | 7/1990 | Raybould et al. | 310/156.11 |
| 6,727,617 B1 * | 4/2004 | McMullen et al. | 310/90.5 |
| 6,838,792 B1 * | 1/2005 | Matsushita et al. | 310/49 R |
| 6,882,073 B1 * | 4/2005 | Suzuki et al. | 310/80 |

* cited by examiner

*Primary Examiner*—Darren Schuberg
*Assistant Examiner*—Judson H. Jones
(74) *Attorney, Agent, or Firm*—Fish & Richardson P.C.

(57) ABSTRACT

A rotor construction may comprise a rotor with a centrally located permanent magnet section having aligned magnet segments and having a central hole throughout its length. A thin rod of magnetic steel is located in this central hole to support the permanent magnets from within. At each end of the rod are located threaded sections for attachment to supporting end stubs. A high strength steel sleeve is interference fit over both the magnets and the end stubs to provide a mechanical link from stub to stub. The guide rod insures that the end stubs and central magnet are concentric during initial processing, prevents relative motion between the rotor components and provides support for the magnet once the sleeve is installed.

8 Claims, 2 Drawing Sheets

PERMANENT MAGNET ROTOR CONSTRUCTION WHEREIN RELATIVE MOVEMENT BETWEEN COMPONENTS IS PREVENTED

BACKGROUND OF THE INVENTION

1. Field of the Invention

The present invention provides a high stiffness permanent magnet rotor for use in high speed electric motors and generators.

2. Description of the Prior Art

The apparatus set forth in U.S. Pat. Nos. 4,667,123 and 4,741,094 utilize sleeved magnet rotors that offer containment of permanent magnet rotors at high speeds. Although the designs set forth in the referenced patents provide advantages over the prior art systems described therein, the rotor construction described are not robust and cost effective for the specific system that the rotor construction is utilized with. In addition, difficulties in the prior art with magnets breaking, shifting, collapsing during assembly, and releasing from the rotor during operation have prevented their widespread use. What is thus desired is to provide a cost effective method to assemble, align and lock the permanent magnets into the rotor allowing for high speed, high stress applications while avoiding the problems encountered in the prior art.

SUMMARY OF THE PRESENT INVENTION

The present invention provides an improved construction method and arrangement for a permanent magnet rotor for use in high-speed generators and motors. The construction utilizes a central rod through the core of the rotor that is screwed into end stubs at each end beyond the centrally located permanent magnet section. The permanent magnet section consists of aligned magnet segments forming a hollow rod that has a central hole throughout its length. A thin rod of steel is located in this central hole to support the permanent magnets from within the rod can be fabricated from magnetic or non-magnetic material. At each end of the rod are located threaded sections for attachment to each supporting end stub. These are aligned with the central magnet section with pilot surfaces on each of the rotor and corresponding pilot bores on each stub shaft end. A high strength non-magnetic steel sleeve is interference fit over both the magnets and the end stubs to provide a mechanical link from stub to stub, and provide the necessary rotor stiffness for dynamic performance. The guide rod is used to provide support for the end stubs and central magnet during the grinding and sleeving process. The addition of the pilot surfaces and its close fit with the magnet inner diameter for magnet support are enabling features for a consistently performing rotor assembly in high speed equipment. The rotor is tightly constructed preventing relative motion between the rotor components and thus maintains its structural integrity throughout its operating life.

The use of a central rod is accordance with the teachings of the present invention thus significantly improves the manufacturability and reliability of the rotor while reducing rotor cost and simplifying the rotor construction.

DESCRIPTION OF THE DRAWING

For a better understanding of the present invention as well as other objects and further features thereof, reference is made to the following description which is to be read in conjunction with the accompanying drawing wherein.

DESCRIPTION OF THE INVENTION

Figure 1:
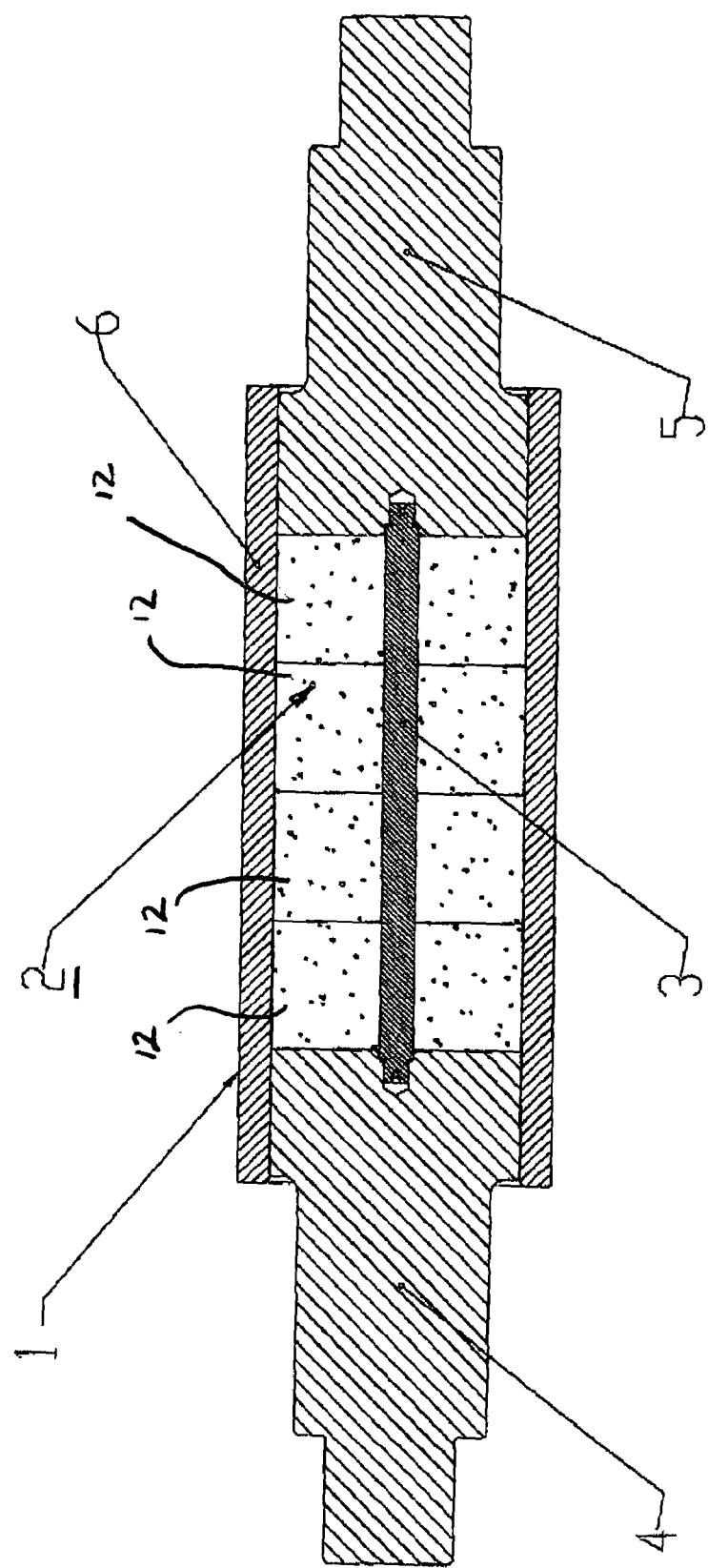
FIG. 1 is a sectional perspective view of the rotor construction in accordance with the teachings of the present invention.

FIG. 1 is a sectional view of the assembled rotor 1 in accordance with the teachings of the present invention. Rotor assembly 1 comprises permanent magnet 2, guide rod 3 and end stub shafts, or end pieces, 4 and 5. Permanent magnet 2 is formed with one or multiple segments bonded together to form an opening adapted to receive guide rod 3 therethrough. This type of rotor if typically used on a high speed, two pole permanent magnet motor and/or generator. The permanent magnet is magnetized to its desired magnetic field either at the component, sub assembly, or final assembly level. Magnetizing at the final assembly level allows the rotor to be first assembled and machined, thereby reducing cost and complexity.

Figure 2:
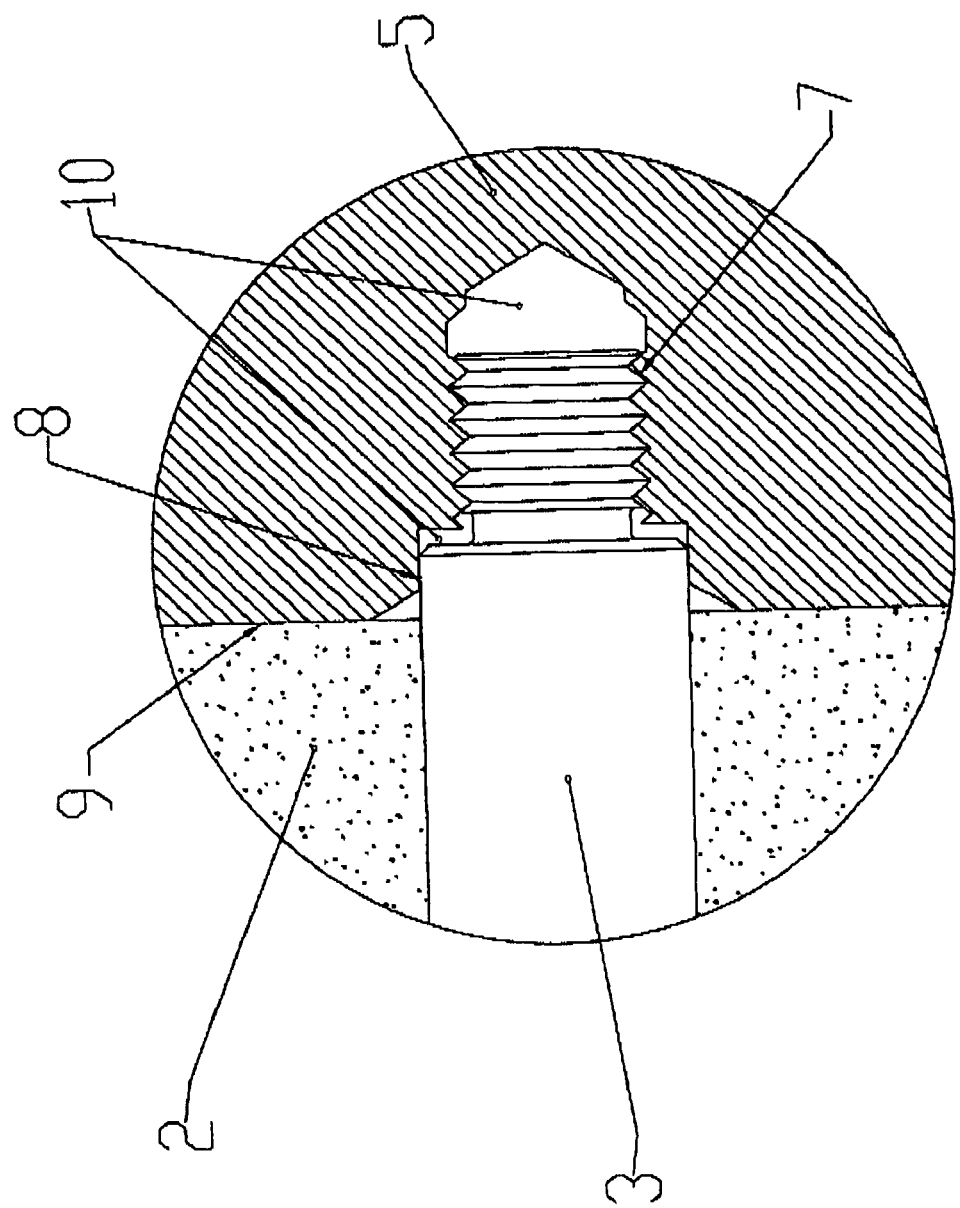
FIG. 2 is an enlarged fragmented sectional view of the rotor construction shown in FIG. 1 illustrating the interface details between the rod and end stubs of the rotor components.

The specific features of a rotor using segmented permanent magnets is disclosed in copending application Ser. No. 10/078,572, filed Feb. 10, 2002, the details of which are necessary for an understanding of the present invention being incorporated herein by reference. Guide rod 3 is installed in the permanent magnet 2 and bonded in place within the opening and sized to be a near line to line fit with the permanent magnet 2 to provide support at the inner diameter of the magnet when the sleeve 6 is installed to minimize the possibility of magnet cracking. Guide rod 3, when fabricated from magnetic material, such as magnetic steel, also provides a magnetic path for the permanent magnet field at the magnet inner diameter, thereby maximizing magnet performance. Referring to FIG. 2, the guide rod 3 has pilots 8 that are closely toleranced with the outer diameter of rod 3 to allow piloting of the non-magnetic end stub shafts 4 and 5, thus aligning the outer diameter of magnet 2 and those of the end stub shafts 4 and 5. The threaded ends 7 of the guide rod 3 are used to secure the magnet rod assembly onto each of the stub shafts, facing up against the magnet ends and putting the magnet in compression axially. Clearances 10 are designed into the assembly so the magnet 2 face seats against the end stub 5 axially on surface 9. This insures the magnet 2 is in compression at assembly and no gap between end stub 5 and magnet 2 is present. Without clearances 10, the rod 3 may otherwise hit the stub shaft 5 prior to the magnet 2 facing against the stub shaft 5, leaving a gap between magnet and stub shaft. A gap at surface 9 would reduce the structural integrity of the assembly causing manufacturing and operational issues.

Once the magnet 2, guide rod 3, and stub shafts 4 and 5 are all assembled, the outer diameter of the formed assembly is machined to provide a substantially uniform outer diameter. A sleeve 6 is then assembled over the magnet 2 and the end stubs 4 and 5. Due to the high interference fit between the sleeve 6 and the magnet 2 and end stubs 4 and 5, assembly can be accomplished by heating the sleeve 6 to a high temperature so that it increases in diameter and cooling the remaining subassembly to shrink its diameter to provide a clearance between the sleeve 6 and rotor subassembly. The full shrink fit is accomplished after the sleeve and the remaining subassembly equalize in temperature. The high strength sleeve 6 provides a mechanical link between the end stubs 4 and 5 for high shaft stiffness, as the magnet material is itself inherently weak structurally. This allows the stiffness path to be through the end stub 4, to sleeve 6 to end stub 5, removing magnet 2 from the required stiffness path.

When the permanent rotor magnet 2 is to be fabricated as a cylinder of magnetized material, it preferably comprises multiple cylindrically shaped disks 12 bonded together. The disks 12 are assembled onto the guide rod 3 and bonded to the adjacent segment until the required number of segments to form the required length are installed. The bond agent also acts as an electrical insulator from the adjacent segments to minimize eddy currents generated as a result of high speed operation of the rotor, thereby reducing rotor operating temperature and improving efficiency.

The rod 3 is preferably made of a ferrous steel material with high compressive strength and a thermal expansion characteristic as close to the magnetic material 2 as possible. A rod material which can be used is ANSI 4340 steel. The length of the rod is determined by the length of the magnet 2 selected to achieve the required motor/generator performance. The diameter of the rod is approximately ⅕ the diameter of the rotor outer diameter, but larger and smaller diameters can be used to achieve particular characteristics for ease of assembly.

In essence, the guide rod 3 functions to provide a reliable, consistent construction method that aligns and mechanically locks the permanent magnet 2 to the end stubs 4 and 5 to insure that the construction is accomplished consistently. The outer diameter of the assembled rotor (without sleeve 6 installed) is ground to finally align the end stubs 4 and 5 and magnet 2. The guide rod 3 functions to mechanically hold the magnet 2 in relation to the end stubs 4 and 5 during the grind and sleeving process thereby insuring the magnet 2 does not shift and result in a damaged rotor.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A permanent magnet rotor assembly having a longitudinal axis comprising:
   a permanent magnet having a central aperture extending along said longitudinal axis;
   a rod member having first and second ends positioned within said central aperture and extending along said longitudinal axis;
   a first shaft member secured to said first end of said rod member;
   a second shaft member secured to said second end of said rod member; and
   a sleeve member extending along said longitudinal axis and fitted about a portion of said permanent magnet and wherein sleeve member mechanically links the first and second shaft members.

2. The assembly of claim 1 wherein said first and second rod member ends are threaded.

3. The assembly of claim 2 wherein said first and second threaded ends extend into mating threaded openings formed in said first and second shaft members, respectively.

4. The assembly of claim 1 wherein said rod member is fabricated from ferrous material.

5. The assembly of claim 1 wherein said magnet comprises multiple disk shaped members.

6. The assembly of claim 6 wherein said disk shaped members are bonded together.

7. The assembly of claim 4 wherein said material comprises steel.

8. The assembly of claim 1 wherein said sleeve member is shrink fit to said first and second shaft members.

* * * * *

UNITED STATES PATENT AND TRADEMARK OFFICE
CERTIFICATE OF CORRECTION

PATENT NO.         : 7,042,118 B2
APPLICATION NO.    : 10/704310
DATED              : May 9, 2006
INVENTOR(S)        : Patrick T. McMullen and Co Si Huynh It is certified that error appears in the above-identified patent and that said Letters Patent is hereby corrected as shown below:

In column 1, line 59 – replace "is" with -- in --

In column 2, line 19 – replace "if" with -- is --

Signed and Sealed this

Twenty-first Day of November, 2006

JON W. DUDAS
*Director of the United States Patent and Trademark Office*